United States Patent [19]

Barthelemy

[11] Patent Number: 4,937,315

[45] Date of Patent: Jun. 26, 1990

[54] TRANSPARENT AMORPHOUS POLYAMIDE HAVING HIGH TG FROM HINDERED AROMATIC DIAMINE AND BRANCHED CHAIN ALIPHATIC DIAMINE

[75] Inventor: Pascal Barthelemy, Lyons, France

[73] Assignee: Rhone-Poulenc Chimie, Courbevoie, France

[21] Appl. No.: 366,473

[22] Filed: Jun. 15, 1989

[30] Foreign Application Priority Data

Jun. 15, 1988 [FR] France ................... 88 08260

[51] Int. Cl.$^5$ ............................................. C08G 69/26
[52] U.S. Cl. ................................ 528/349; 525/432; 528/183; 528/220; 528/229; 528/337; 528/340; 528/347
[58] Field of Search ............... 528/349, 347, 340, 337, 528/220, 229, 183; 525/432

[56] References Cited

U.S. PATENT DOCUMENTS

| | | | |
|---|---|---|---|
| 3,382,216 | 5/1968 | Blaschke et al. | 260/78 |
| 3,941,755 | 5/1976 | Chapman et al. | 260/78 |
| 4,163,101 | 7/1979 | Schade et al. | 528/349 |
| 4,207,411 | 6/1980 | Shue | 528/349 |
| 4,382,138 | 5/1983 | Paschke | 528/349 |
| 4,384,112 | 5/1983 | Paschke | 528/349 |

OTHER PUBLICATIONS

Chemical Abstracts, vol. 71, Abstract No. 114079d (1969), p. 75.

*Primary Examiner*—Harold D. Anderson
*Attorney, Agent, or Firm*—Burns, Doane, Swecker & Mathis

[57] ABSTRACT

Amorphous and transparent copolyamides having glass transition temperatures, Tg, greater than 140° C. and improved thermomechanical properties, well adopted for the production of a wide variety of useful shaped articles, contain specified amounts of terephthalic acid, 2-methylpentamethylenediamine and hindered aromatic diamine recurring structural units.

5 Claims, No Drawings

TRANSPARENT AMORPHOUS POLYAMIDE HAVING HIGH TG FROM HINDERED AROMATIC DIAMINE AND BRANCHED CHAIN ALIPHATIC DIAMINE

CROSS-REFERENCE TO COMPANION APPLICATION

My copending application Ser. No. 07-366,472, filed concurrently herewith and assigned to the assignee hereof.

BACKGROUND OF THE INVENTION

1. Field of the Invention:

The present invention relates to transparent amorphous polyamides, and, more especially, to transparent amorphous polyamides produced from terephthalic acid, 2-methylpentamethylenediamine and a hindered aromatic diamine.

2. Description of the Prior Art:

Polyamides produced from aliphatic amines and from aromatic dicarboxylic acids have long been known to this art. Many polyamides are crystallized (and thus are designated "semicrystalline" polymers) and the crystallized polymers cannot be used in all fields, in particular for those applications which require transparency. Exemplary crystallized polyamides are notably those polymers produced from terephthalic acid and hexamethylenediamine, or those produced from terephthalic acid and 2-methylpentamethylenediamine (JA-A-69/019,551). Other polyamides are amorphous. They soften at a relatively low temperature and exhibit a low glass transition temperature (Tg). Exemplary amorphous polyamides include, for example, those polymers produced from terephthalic acid, isophthalic acid (70 to 85 mol % in the mixture of diacids) and hexamethylenediamine (U.S. Pat. No. 3,382,216), which have a Tg of from 100° to 120° C.

Amorphous polyamides are especially suitable for the manufacture of sheets, tapes, plaques, tubes, cable sheating and injection-molded shaped articles. However, because of their low Tg, these polyamides can be used only at low temperatures, and this greatly restricts their potential applications. Polyamides of higher Tg are described in French Patent FR-A-2,325,673; they are produced from terephthalic acid, isophthalic acid (15 to 30 mol % in the mixture of diacids) and 2-methyl-1,5-pentamethylenediamine, but the highest available Tg with these polyamides is 142° C.

Since the Tg is an important factor that will determine the thermomechanical stability of the amorphous polymers, serious need continues to exist in this art for amorphous polyamides having a Tg higher than 142° C.

SUMMARY OF THE INVENTION

Accordingly, a major object of the present invention is the provision of a novel class of amorphous polymides prepared from specific amounts of terephthalic acid, 2-methyl-1,5-pentamethylenediamine and a particular hindered aromatic diamine, which novel amorphous copolyamides have a Tg higher than 142° C., preferably ranging from 145° C. to 170° C.

Briefly, the present invention features novel amorphous and transparent copolyamides produced from teterphthalic acid or a derivative thereof, 2-methylpentamethylenediamine and a hindered aromatic diamine, said copolyamides comprising recurring structural units of the following formulae (I), (II), optionally (II'), and (III):

(I) denoting the structure:

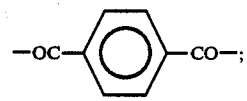

(II) denoting the structure:

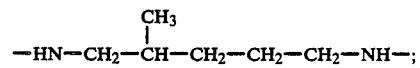

(II') denoting the structure:

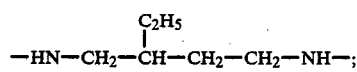

(III) denoting the structure:

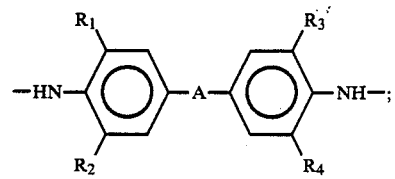

in which each of the symbols $R_1$, $R_2$, $R_3$ and $R_4$, which may be identical or different, is a methyl, ethyl, propyl or isopropyl radical, with the provisos that $R_1=R_2=R_3=R_4$, or $R_1=R_2$ and $R_3=R_4$, or $R_1=R_3$ and $R_2=R_4$, or $R_1=R_4$ and $R_2=R_3$, and the symbol A is one of the following groups:

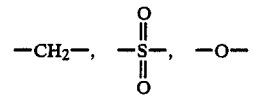

or

with the further provisos that (i) the molar ratio of the units (I) relative to the sum of the units (II)+(II')+(III) is equal to 1; (ii) the amount of units (II') in the mixture (II)+(II') ranges from 0 to 5 mol % and that of the units (II), relative to the same mixture, ranges from 100 to 95 mol %; and (iii) the amount of units (III) in the mixture (II)+(II')+(III) ranges from 8 to 50 mol % when each of the four symbols $R_1$, $R_2$, $R_3$ and $R_4$ is a radical containing more than one carbon atom, or ranges from 13 to 50 mol % when two of the four symbols $R_1$, $R_2$, $R_3$ and $R_4$ are radicals containing more than one carbon atom (each of the other two symbols then being a methyl radical), or ranges from 18 to 50 mol % when each of the four symbols $R_1$, $R_2$, $R_3$ and $R_4$ is a methyl radical.

DETAILED DESCRIPTION OF THE PREFERRED EMBODIMENTS OF THE INVENTION

More particularly according to the present invention, when the amount of units (III) is less than either of the minimal values indicated above, the copolyamides produced are semicrystalline.

The recurring units of formula (I) are derived from terephthalic acid or from a derivative thereof, such as, for example, a dihalide or a diester.

The recurring units of formula (II) are derived from 2-methyl-1,5-pentamethylenediamine. As regards the optional recurring units of formula (II'), these are derived from 2-ethyl-1,4-tetramethylenediamine. The synthesis of 2-methylpentamethylenediamine may be carried out by hydrogenation of the dinitrile of 2-methylglutaric acid according to known processes. Similarly, the synthesis of 2-ethyltetramethylenediamine may be carried out by hydrogenation of the dinitrile of 2-ethylsuccinic acid.

As regards the recurring units of formula (III), these are derived from diamines of the general formula:

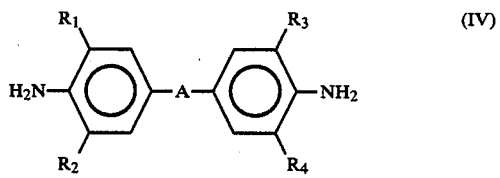

in which the symbols $R_1$, $R_2$, $R_3$, $R_4$ and A are as defined above in connection with the recurring units of formula (III).

In a preferred embodiment of the invention, the copolyamides have a structure as defined above, in which the units (III) are as defined above with A=—CH$_2$—; and the amount of units (III) in the mixture (II)+(II')+(III) ranges from 10 to 40 mol % when each of the four symbols $R_1$, $R_2$, $R_3$ and $R_4$ is a radical containing more than one carbon atom, or ranges from 15 to 40 mol % when two of the four symbols $R_1$, $R_2$, $R_3$ and $R_4$ are radicals containing more than one carbon atom, or ranges from 20 to 40 mol % when each of the four symbols $R_1$, $R_2$, $R_3$ and $R_4$ is a methyl radical.

Exemplary of the hindered diamines of formula (IV) which provide the recurring units of formula (III) in which A =—CH$_2$—, the following are particularly representative: 4,4'-diamino-3,3',5,5'-tetramethyldiphenylmethane;

4,4'-diamino-3,3',5,5'-tetraethyldiphenylmethane;

4,4'-diamino-3,5-dimethyl-3',5'-diethyldiphenylmethane;

4,4'-diamino-3,3'-diethyl-5,5'-dimethyldiphenylmethane;

4,4'-diamino-3,3',5,5'-tetraisopropyldiphenylmethane; and 4,4'-diamino-3,3'-diisopropyl-5,5'-dimethyldiphenylmethane.

These hindered diamines can be prepared according to the processes described in British Patent GB-A-852,651 and U.S. Pat. No. 3,481,900.

Exemplary of the copolyamides belonging to the preferred group described above, those which are very particularly suitable are the polymers which have a structure in which the recurring units of formula (III) are derived from the following hindered diamines:

4,4'-diamino-3,3'-diethyl-5,5'-dimethyldiphenylmethane;

4,4'-diamino-3,3',5,5'-tetraethyldiphenylmethane; and 4,4'-diamino-3,3',5,5'-tetraisopropyldiphenylmethane.

These copolyamides comprising recurring structural formulae (I), (II), optionally (II'), and (III) are easily prepared by polycondensation processes which are well known to this art.

For example, a convenient operating technique entails a melt polycondensation process. The diamines and the dicarboxylic acid are introduced into a stainless steel autoclave, water being added if appropriate. It is sometimes advantageous to prepare salts of the diamines and of the dicarboxylic acid beforehand. The reactants are heated to a temperature ranging approximately from 200° to 250° C., under stirring. The water vapor is removed and the temperature is increased to approximately 260° to 300° C. At this temperature, the reaction mixture is stirred for a certain period of time in a nitrogen atmosphere. Finally, vacuum is applied to the autoclave and the condensation is continued to such point in time when the polyamide has reached the desired molecular weight. A lower alkyl ester, such as for example a methyl ester, of the dicarboxylic acid can also be reacted with the mixture of diamines. This process may entail carrying out the following two steps in sequence, in the same single reactor: the first step is a prepolymerization at atmospheric pressure and at a temperature on the order of 90° to 130° C. with removal of the alcohol formed; in the second step, the temperature is increased to about 250° to 300° C. with distillation of the alcohol to complete the polycondensation.

Another convenient such process is the technique of polycondensation in solution, according to which the halide of the dicarboxylic acid, such as, for example, the diacid chloride (terephthaloyl chloride), is reacted with the mixture of the diamines while operating in a solvent free from traces of water. The solvents which are commonly employed are good solvents for, or solvents which swell the polymers to be synthesized. They are generally polar and aprotic in nature. For greater efficiency of the polycondensation, it is also necessary to dissolve in the reaction mixture an organic base capable of reacting with the hydracid released during the acylation reaction. This base is typically a tertiary amine such as, for example, triethylamine, diisopropylbutylamine or pyridine. During the polycondensation, the temperature of the reaction mixture is customarily maintained constant and relatively low, such as between 0° C. and 10° C. Once the addition of the reactants is completed, ambient temperature is restored. The polymer can then be isolated by precipitation in a nonsolvent.

Yet another convenient process for preparing the copolyamides according to the invention is be interfacial polycondensation. This takes place at the interface between an aqueous solvent containing the halide of the dicarboxylic acid (for example: dichloromethane, tetrachloroethylene). An inorganic base is typically dissolved in the aqueous phase to trap the hydracid released during the acylation reaction. The reaction temperatures are generally maintained from 0° C. to 10° C., this being in order to limit the formation of oligomers of low molecular weight.

In any one of the aforementioned process, the reactants are employed in such proportions that: (i) the molar ratio terephthalic acid or derivative thereof/diamine is equal to 1; (ii) the amount of 2-ethyl-1,4-tetramethylenediamine in the mixture of 2-ethyl-1,4-tetramethylenediamine +2-methyl-1,5-pentamethylenediamine ranges from 0 to 5 mol %; and (iii) the amount of hindered aromatic diamine of formula (IV) in the mixture of diamines ranges from 8 to 50 mol %;, and preferably from 10 to 40 mol %, when each of the four symbols $R_1$, $R_2$, $R_3$ and $R_4$ is a radical containing more than one carbon atom, or ranges from 13 to 50 mol %, and preferably from 15 to 40 mol %, when two of the four symbols $R_1$, $R_2$, $R_3$ and $R_4$ are radicals containing more than one carbon atom (each of the other two symbols then being a methyl radical), or ranges from 18 to 50 mol %, and preferably from 20 to 40 mol %, when each of the four symbols $R_1$, $R_2$, $R_3$ and $R_4$ is a methyl radical.

When compared with the amorphous and transparent polyamides described in French Patent FR-A-2,325,673, the copolyamides according to the present invention are distinguished particularly by a higher glass transition temperature Tg which ranges from 145° to 170° C. and, consequently, by a better stability of the polymer and a better retention of mechanical properties at elevated temperatures. By replacing the recurring units of formula (III) with structural units derived from a hindered diamine other than those corresponding to the above formula (IV), for example isophoronediamine of formula:

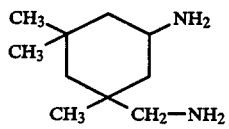

it has been found that, with the same amounts of recurring units (III), the copolyamides thus produced from such replacement diamine are semicrystalline and have a low Tg which is well below 150° C. Hence, it is quite surprising that the amorphous copolyamides of the present invention have a high Tg.

The copolyamides according to this invention are random polymers They have an overall amorphous structure; this makes it possible to realize the advantages associated, on the one hand, with the ease of conversion in the molten state due to the absence of crystallinity and, on the other hand, with the good transparency of such polymers. The subject copolyamides can be used as a molding powder and can be converted using conventional injection-molding, extrusion or spinning apparatus to provide shaped articles such as hollow bodies, films, foils or filaments.

The additives usually employed during the preparation of polyamides, which advantageously are soluble in the copolyamide when their transparency plays an important role, may be added to the copolyamides of the invention before, during or near the final stages of the polycondensation.

These additives are, for example, antioxidants, fireproofing agents, light stabilizers, heat stabilizers, impact modifiers, plasticizers, mold release agents, optical whiteners, colorants, and the like.

In the case where the transparency of the copolyamides in accordance with the invention plays a less important role, the additives mentioned above may also be less soluble in the copolyamide, and it is also possible to incorporate reinforcing fillers such as organic or inorganic fibers, pigments, inorganic powders, and the like.

These additives may be mixed with the copolyamides, or else may be incorporated therein by a new melting operation in suitable apparatus, for example in an extruder.

The copolyamides in accordance with the present invention may also be blended or mixed with other homo- or copolyamides or mixtures thereof, or with other plastic materials. This is carried out, for example, by blending the granulates or the constituent plastic materials and then performing a coextrusion.

Exemplary polymers intended as such additional homopolyamide include, for example, nylon 12 (polymer of $\omega$-aminododecanoic acid), nylon 11 (polymer of $\omega$-aminoundecanoic acid), nylon 69 (polymer of hexamethylenediamine and of azelaic acid), nylon 610 (polymer of hexamethylenediamine and of sebacic acid), nylon 6 (polymer of $\epsilon$-caprolactam) or nylon 66 (polymer of hexamethylenediamine and of adipic acid). Exemplary such copolyamides include, for example, those comprising the monomers of the above-mentioned homopolyamides or other copolyamides.

In order to further illustrate the present invention and the advantages thereof, the following specific examples are given, it being understood that same are intended only as illustrative and in nowise limitative.

EXAMPLE 1 AND COMPARATIVE TESTS A AND B:

Copolyamide of the invention produced from terephthaloyl chloride, 2-methyl-1,5-pentamethylenediamine and 4,4'-diamino-3,3',5,5'-tetraethyldiphenylmethane [the amount of recurring units (III) in the mixture of diamines was 10 mol %].

1. Synthesis of the copolyamide:

The following materials were introduced at ambient temperature (20° C.) under a dry nitrogen atmosphere into a 1-liter three-necked reactor made of Pyrex (registered trademark) glass, fitted with a central anchor stirrer and a dropping funnel:

(i) 42.42 g (0.3657 mole) of 2-methylpentamethylenediamine;

(ii) 83.67 g of triethylamine;

(iii) 12.58 g (0.0406 mole) of 4,4'-diamino-3,3',5,5'-tetraethyldiphenylmethane; and (iv) 116 g of 1,3-dimethyl-2-imidazolidone, dried beforehand for 5 hours over a 4 Å molecular sieve available commercially under the registered trademark Prolabo.

A solution of 82.47 g (0.4063 mole) of terephthaloyl chloride (recrystallized from cyclohexanone) in 450 g of 1,3-dimethyl-2-imidazolidone, dried beforehand as indicated above, was introduced into the dropping funnel under a dry nitrogen atmosphere.

The reactor was then cooled with iced water such as to adjust the temperature of the reaction mixture to a temperature on the order of 8° C. The contents of the dropping funnel were then introduced, under a dry nitrogen atmosphere, under rapid stirring and dropwise, into the reactor over a period of 4 hours, the temperature of the reaction mixture being maintained at about 8° C. When the addition of terephthaloyl chloride was completed, a solution containing approximately 15% by weight of polymer was obtained. It was permitted to return to ambient temperature and stirring of the reaction mixture was then continued for 10 hours at this temperature.

The copolyamide obtained was precipitated by pouring the reaction mixture into 5 liters of water. The polymer was filtered off and was then washed 4 times in succession, each time with 4 liters of water, until the final aqueous washing no longer contained any chloride ions (detected using AgNO3). The polymer was drained under vacuum and was then dried in an oven at 80° C.

under a vacuum corresponding to $1.33 \times 10^2$ Pa until a constant weight of 105 g was obtained. The yield of this synthesis was 97.2% (this yield is expressed on a weight basis relative to the theoretical weight of the expected polymer).

2. Characterization of the copolyamide:

The copolyamide obtained was amorphous (it exhibited a Tg, but not a melting temperature) and transparent, and it had an inherent viscosity of 1.07 dl/g. This viscosity was measured at 25° C. on a solution containing 5 g of polymer in 1 liter of meta-cresol.

Its weight-average molecular weight ($\overline{M}w$), determined by gel permeation chromatography with calibration using polystyrene, was 94,110.

The glass transition temperature Tg, determined by differential thermal analysis (DTA) with a rate of temperature increase of 10° C./min, carried out under a nitrogen atmosphere, was 158° C.

The melt viscosity of the polymer, determined at 280° C. at a shear rate of 10 s$^{-1}$ with the aid of a Gottfert (registered trademark) rheometer, was 4500 Pa.s.

The proton NMR analysis (solvent: CF$_3$COOD; internal standard: tetramethylsilane) confirmed the random polymer structure containing the following blocks:

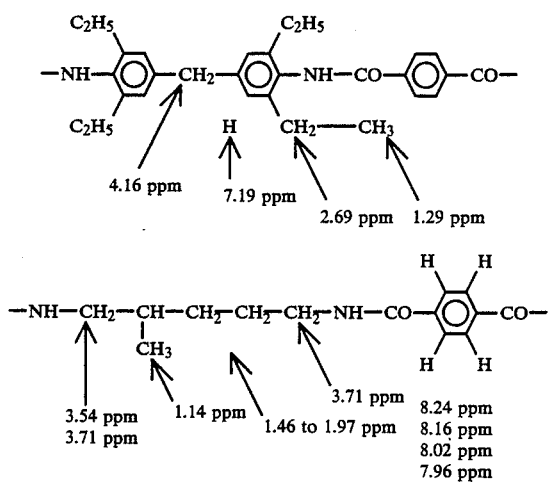

The polymer obtained was dried again in an oven at 100° C. for 15 hours under a vacuum corresponding to $1.33 \times 10^2$ Pa, and molded test specimens $80 \times 10 \times 4$ mm in size were then prepared, enabling the values of the torsional modulus to be measured as a function of temperature. These test specimens were prepared using a screw press marketed under the trademark KAP. For this, the polymer, dried as indicated above, was injection-molded under the following conditions: melt kettle temperature=280° C.; mold temperature=110° C.; material injection pressure=$7 \times 10^5$ Pa; cycle time=1 min. The torsional modulus was determined at different temperatures with an automatic torsion pendulum at a frequency on the order of 1 hertz according to ISO standard R 527, method B, the test specimens being aged at 0% relative humidity (the test specimens were placed in a desiccator over silica gel and dried for 24 hours at 20° C. under a reduced pressure of $1.33 \times 10^2$ Pa before the measurements were performed). The results of the torsional measurements are reported below:

| Temperature °C. | Torsional modulus MPa |
| --- | --- |
| 0 | 850 |
| 100 | 720 |
| 150 | 630 |
| 155 | 400 |
| 160 | 270 |

The test specimens were found to maintain their torsional modulus remarkably well as a function of temperature, up to approximately 150° C.

3. Comparative tests:

3.1. TEST A: examination of the behavior of an amorphous copolyamide as described in French Patent FR-A-2,325,673:

The same operations as those described above in paragraphs 1 and 2 were reproduced, but this time using the following new charges:

in the three-necked reactor:

(i) 47.11 g (0.4061 mole) of 2-methyl-1,5-pentamethylenediamine;

(ii) 83.67 g of triethylamine; and (iii) 116.6 g of 1,3-dimethyl-2-imidazolidone (dried over sieve);

in the dropping funnel:

(iv) 65.96 g (0.3249 mole) of terephthaloyl chloride (recrystallized);

(v) 16.49 g (0.0812 mole) of isophthaloyl chloride (20 mol % in the mixture of chlorides); and (vi) 450 g of 1,3-dimethyl-2-imidazolidone (dried over sieve).

The yield of this synthesis was 92%.

The copolyamide produced was indeed amorphous, but it exhibited a Tg, determined as indicated in paragraph 2, which was much lower and which was equal to 142° C.

Inherent viscosity of the copolyamide: 0.9 dl/g.

Weight-average molecular weight: 71,700.

3.2. TEST B: examination of the behavior of a copolyamide of the invention, in the preparation of which 4,4'-diamino-3,3',5,5'-tetraethyldiphenylmethane was replaced with the same amount of another hindered diamine, i.e., isophoronediamine:

The operation was carried out as indicated in paragraph 1 above, but starting with the following reactants and charges and performing certain changes in operation:

in the three-necked reactor:

(i) 10.59 g (0.0913 mole) of 2-methyl-1,5-pentamethylenediamine;

(ii) 20.94 g of triethylamine;

(iii) 1.72 g (0.0102 mole) of isophoronediamine; and (iv) 21 g of 1,3-dimethyl-2-imidazolidone (dried over sieve);

in the dropping funnel:

(v) 20.60 g (0.1015 mole) of terephthaloyl chloride (recrystallized); and (vi) 112.5 g of 1,3-dimethyl-2-imidazolidone (dried over sieve).

The contents of the dropping funnel were introduced into the reactor over 2 hours, 15 minutes. After precipitation of the polymer in 2 liters of water, it was washed twice, each time with 2 liters of water.

The yield of this synthesis was 89%.

The copolyamide obtained was semicrystalline: it had a low Tg equal to 140° C.; its melting point (Tm), determined, like the Tg, by differential thermal analysis, was found to be equal to 260° C.

EXAMPLES 2 AND 3 AND COMPARATIVE TEST C:

Copolyamides in accordance with Example 1 above, in which the amount of units (III), derived from 4,4'-diamino-3,3',5,5'-tetraethyldiphenylmethane, in the mixture of diamines was modified as follows:

Example 2: 20 mol %;
Example 3: 30 mol %;
Test C: 5 mol %.

The same operations as those described above in Example 1 were repeated, but this time using a 250-cm³ glass reactor, and the following new charges and another solvent (N-methyl-2-pyrrolidone instead of 1,3-dimethyl-2-imidazolidone), also dried over molecular sieve beforehand:

| Reactants/solvent | Example 2 | Example 3 | Test C |
|---|---|---|---|
| in the glass reactor: | | | |
| Methylpenta-methylene-diamine: | 4.76 g (0.0410 mole) | 4.06 g (0.0350 mole) | 5.51 g (0.0475 mole) |
| Triethyl-amine: | 10 g | 10.34 g | 10.11 g |
| Hindered aromatic diamine: | 3.10 g (0.0100 mole) | 4.65 g (0.0150 mole) | 0.775 g (0.0025 mole) |
| N-Methyl-2-pyrrolidone: | 38.47 g | 41 g | 43.60 g |
| in the dropping funnel: | | | |
| Terephtha-loyl chloride: | 10.35 g (0.0510 mole) | 10.15 g (0.0500 mole) | 10.15 g (0.0500 mole) |
| N-Methyl-2-pyrrolidone: | 38.47 g | 41 g | 43.60 g |

In these examples and test, the contents of the dropping funnel were introduced over 45 minutes. After precipitation of the polymer in 1.5 liters of water, it was washed 3 times, each time with 1 liter of water.

The table which follows reports the principal results of these examples and test:

| Example/test | Synthesis yield | Nature of the copolyamide | Tg | Tm | $\overline{Mw}$ |
|---|---|---|---|---|---|
| 2 | 85% | amorphous | 162° C. | — | 45,000 |
| 3 | 80% | amorphous | 165° C. | — | 30,000 |
| C | 93% | semicrystalline | 144° C. | 268° C. | 30,000 |

EXAMPLE 4:

Copolymer in accordance with the invention in which the units (III) were derived from 4,4'-diamino-3,3',5,5'-tetraisopropyldiphenylmethane, the amount of these units in the mixture of diamines being 10 mol %.

The same operations as those described in Example 1 above were repeated, but this time using a 250-cm³ glass reactor and the following new charges:

in the glass reactor:
(i) 5.22 g (0.0450 mole) of 2-methylpentamethylenediamine;
(ii) 10.10 g of triethylamine;
(iii) 1.83 g (0.0050 mole) of 4,4'-diamino-3,3',5,5'-tetraisopropyldiphenylmethane; and
(iv) 30 g of 1,3-dimethyl-2-imidazolidone (dried over sieve);

in the dropping funnel:
(v) 10.15 g (0.0500 mole) of terephthaloyl chloride (recrystallized); and
(vi) 40 g of 1,3-dimethyl-2-imidazolidone (dried over sieve).

The contents of the dropping funnel were introduced over 60 minutes. After precipitation of the polymer in 1 liter of water, it was washed 3 times, each time with 1 liter of water.

The yield of this synthesis was 85%.

The copolyamide obtained was amorphous and had a Tg equal to 148° C. Its weight-average molecular weight was equal to 53,000.

EXAMPLE 5 AND COMPARATIVE TEST D:

Copolyamides in which the units (III) were derived from 4,4'-diamino-3,3'-diethyl-5,5'-dimethyldiphenylmethane, the amount of these units in the mixture of diamines being established as follows:

Example 5: 15 mol %;
Test D: 10 mol %.

The same operations as those described above in Example 1 were repeated, but this time using a 250-cm³ glass reactor and the following new charges:

| Reactants/solvent | Example 5 | Test D |
|---|---|---|
| Methylpentamethylene-diamine: | 10.01 g (0.0863 mole) | 10.59 g (0.0913 mole) |
| Triethylamine: | 20.94 g | 20.94 g |
| Hindered aromatic diamine: with methyl and ethyl groups | 4.29 g (0.0152 mole) | 2.88 g (0.0102 mole) |
| Dimethylimidazolidone: | 29 g | 29 g | in the dropping funnel:

| Reactant/solvent | Example 5 | Test D |
|---|---|---|
| Terephthaloyl chloride: | 20.60 g (0.1015 mole) | 20.60 g (0.1015 mole) |
| Dimethylimidazolidone: | 112.50 g | 112.50 g |

The contents of the dropping funnel were introduced over 2 hours, 30 minutes. After precipitation of the polymer in 2 liters of water, it was washed twice, each time with 2 liters of water.

The principal results of this example and test are reported in the table which follows:

| Example/test | Synthesis yield | Nature of the copolyamide | Tg | Tm | $\overline{Mw}$ |
|---|---|---|---|---|---|
| 5 | 94.7% | amorphous | 156° C. | — | 42,000 |
| D | 90% | semicrystalline | 156° C. | 268° C. | 35,000 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An amorphous and transparent copolyamide having a glass transition temperature, Tg, greater than 142°

C., comprising recurring structural units of the following formulae (I), (II), optionally (II'), and (III):

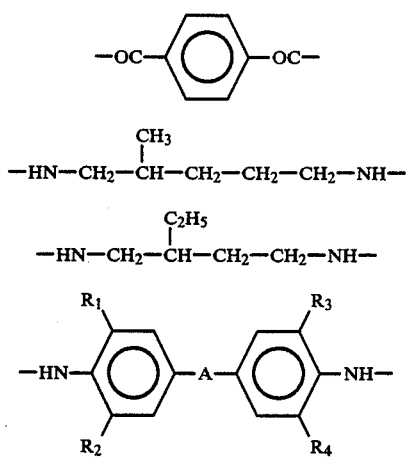

in which each of $R_1$, $R_2$, $R_3$ and $R_4$, which are identical or different, is a methyl, ethyl, propyl or isopropyl radical, with the provisos that $R_1=R_2=R_3=R_4$, or $R_1=R_2$ and $R_3=R_4$, or $R_1=R_3$ and $R_2=R_4$, or $R_1=R_4$ and $R_2=R_3$, and A is —$CH_2$—, —$SO_2$—, —O— or —CO—, and with the further provisos that (i) the molar ratio of the units (I) relative to the sum of the units (II)+(II')+(III) is essentially equal to 1; (ii) the amount of units (II') in the mixture (II)+(II') ranges from 0 to 5 mol % and that of the units (II), relative to the same mixture, ranges from 100 to 95 mol %; and (iii) the amount of units (III) in the mixture (II)+(II')+(III) ranges from 8 to 50 mol % when each of $R_1$, $R_2$, $R_3$ and $R_4$ contains more than one carbon atom, or ranges from 13 to 50 mol % when two of $R_1$, $R_2$, $R_3$ and $R_4$ contain more than one carbon atom and the other two are methyl radicals, or ranges from 18 to 50 mol % when each of $R_1$, $R_2$, $R_3$ and $R_4$ is a methyl radical.

2. The amorphous and transparent copolyamide as defined by claim 1, wherein the recurring units (III) A is —$CH_2$—, and (iii) the amount of units (III) in the mixture (II)+(II')+(III) ranges from 10 to 40 mol % when each of $R_1$, $R_2$, $R_3$ and $R_4$ contains more than one carbon atom, or ranges from 15 to 40 mol % when two of $R_1$, $R_2$, $R_3$ and $R_4$ contain more than one carbon atom, or ranges from 20 to 40 mol % when each of $R_1$, $R_2$, $R_3$ and $R_4$ is a methyl radical.

3. The amorphous and transparent copolyamide as defined by claim 1, said recurring structural units (III) being derived from
4,4'-diamino-3,3'-diethyl-5,5'-dimethyldiphenylmethane,
4,4'-diamino-3,3',5,5'-tetraethyldiphenylmethane, or
4,4'-diamino-3,3',5,5'-tetraisopropyldiphenylmethane.

4. A composition of matter comprising admixture of an amorphous and transparent copolyamide as defined by claim 1, with a nylon 12, 11, 69, 610, 66 or 6 homo- or copolyamide.

5. A shaped article comprising an amorphous and transparent copolyamide as defined by claim 1.

* * * * *